(12) United States Patent
Lindström et al.

(10) Patent No.: US 10,279,796 B2
(45) Date of Patent: May 7, 2019

(54) METHOD OF BRAKING A VEHICLE TOWARDS STOP

(71) Applicant: Scania CV AB, Södertälje (SE)

(72) Inventors: Johan Lindström, Nyköping (SE);
Mathias Björkman, Tullinge (SE);
Mikael Bergquist, Huddinge (SE);
Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 237 days.

(21) Appl. No.: 15/106,811

(22) PCT Filed: Dec. 23, 2014

(86) PCT No.: PCT/SE2014/051569
§ 371 (c)(1),
(2) Date: Jun. 20, 2016

(87) PCT Pub. No.: WO2015/099599
PCT Pub. Date: Jul. 2, 2015

(65) Prior Publication Data
US 2017/0001643 A1   Jan. 5, 2017

(30) Foreign Application Priority Data

Dec. 23, 2013  (SE) .................................. 1351574

(51) Int. Cl.
*B60W 20/15* (2016.01)
*B60W 20/00* (2016.01)
(Continued)

(52) U.S. Cl.
CPC ............... *B60W 20/00* (2013.01); *B60K 1/02* (2013.01); *B60K 6/365* (2013.01); *B60K 6/387* (2013.01);
(Continued)

(58) Field of Classification Search
CPC ...... B60W 10/02; B60W 10/06; B60W 10/08; B60W 10/115; B60W 20/15; B60W 20/40;
(Continued)

(56) References Cited

U.S. PATENT DOCUMENTS

| 5,433,282 A | 7/1995 | Moroto et al. |
| 5,492,189 A | 2/1996 | Kriegler et al. |

(Continued)

FOREIGN PATENT DOCUMENTS

| DE | 19628000 A1 | 1/1997 |
| DE | 19838853 A1 | 3/1999 |

(Continued)

OTHER PUBLICATIONS

International Search Report for PCT/SE2014/051569 dated Apr. 29, 2015.

(Continued)

*Primary Examiner* — Edwin A Young
(74) *Attorney, Agent, or Firm* — Moore & Van Allen PLLC; W. Kevin Ransom

(57) ABSTRACT

Disclosed is a method for control of a vehicle with a drive system comprising a planetary gear and a first and second electrical machine, connected with their rotors to the components of the planetary gear, a braking of the vehicle towards stop occurs by way of a distribution of the desired braking torque between the first and the second electrical machines, and wherein such electrical machines are controlled to transmit a total torque to an output shaft of the planetary gear, which corresponds to the desired braking torque at least to one predetermined low speed limit, before the vehicle stops.

18 Claims, 6 Drawing Sheets

(51) Int. Cl.
*B60K 1/02* (2006.01)
*B60K 6/365* (2007.10)
*B60K 6/387* (2007.10)
*B60K 6/40* (2007.10)
*B60W 10/02* (2006.01)
*B60W 10/06* (2006.01)
*B60W 10/08* (2006.01)
*B60W 30/18* (2012.01)
*B60W 20/20* (2016.01)
*B60K 6/46* (2007.10)
*B60W 10/115* (2012.01)
*B60W 20/40* (2016.01)
*F16H 3/72* (2006.01)
*F02D 41/06* (2006.01)
*F02D 41/26* (2006.01)
*F02D 41/30* (2006.01)
*B60K 6/44* (2007.10)
*B60W 20/30* (2016.01)
*F02D 41/04* (2006.01)
*B60W 10/12* (2012.01)
*B60W 20/10* (2016.01)
*B60K 6/445* (2007.10)
*B60K 6/48* (2007.10)
*B60K 17/02* (2006.01)
*B60W 30/188* (2012.01)
*B60K 6/547* (2007.10)
*B60W 10/10* (2012.01)

(52) U.S. Cl.
CPC .................. *B60K 6/40* (2013.01); *B60K 6/44* (2013.01); *B60K 6/445* (2013.01); *B60K 6/46* (2013.01); *B60K 6/48* (2013.01); *B60K 17/02* (2013.01); *B60W 10/02* (2013.01); *B60W 10/06* (2013.01); *B60W 10/08* (2013.01); *B60W 10/115* (2013.01); *B60W 10/12* (2013.01); *B60W 20/10* (2013.01); *B60W 20/15* (2016.01); *B60W 20/20* (2013.01); *B60W 20/30* (2013.01); *B60W 20/40* (2013.01); *B60W 30/18* (2013.01); *B60W 30/181* (2013.01); *B60W 30/18027* (2013.01); *B60W 30/1886* (2013.01); *B60W 30/18109* (2013.01); *F02D 41/042* (2013.01); *F02D 41/062* (2013.01); *F02D 41/26* (2013.01); *F02D 41/3005* (2013.01); *F16H 3/728* (2013.01); *B60K 6/547* (2013.01); *B60W 10/10* (2013.01); *B60W 30/18009* (2013.01); *B60W 2400/00* (2013.01); *B60W 2510/125* (2013.01); *B60W 2520/40* (2013.01); *B60W 2710/021* (2013.01); *B60W 2710/06* (2013.01); *B60W 2710/0644* (2013.01); *B60W 2710/081* (2013.01); *B60W 2710/083* (2013.01); *B60W 2710/105* (2013.01); *B60W 2710/1038* (2013.01); *B60W 2710/125* (2013.01); *B60W 2710/248* (2013.01); *B60W 2710/30* (2013.01); *B60W 2710/305* (2013.01); *B60W 2720/40* (2013.01); *B60Y 2200/92* (2013.01); *B60Y 2300/18* (2013.01); *B60Y 2300/188* (2013.01); *B60Y 2300/18025* (2013.01); *B60Y 2300/18091* (2013.01); *B60Y 2300/19* (2013.01); *B60Y 2300/43* (2013.01); *B60Y 2300/60* (2013.01); *B60Y 2300/78* (2013.01); *B60Y 2300/84* (2013.01); *B60Y 2400/73* (2013.01); *Y02T 10/6221* (2013.01); *Y02T 10/6239* (2013.01); *Y02T 10/6286* (2013.01); *Y10S 903/903* (2013.01); *Y10S 903/91* (2013.01); *Y10S 903/93* (2013.01); *Y10S 903/945* (2013.01)

(58) Field of Classification Search
CPC ........... B60W 30/181; B60W 30/18109; F16H 3/728
See application file for complete search history.

(56) References Cited

U.S. PATENT DOCUMENTS

| | | |
|---|---|---|
| 5,508,574 A | 4/1996 | Vlock |
| 5,801,499 A | 9/1998 | Tsuzuki et al. |
| 5,895,333 A | 4/1999 | Morisawa et al. |
| 6,018,198 A | 1/2000 | Tsuzuki et al. |
| 6,083,138 A | 7/2000 | Aoyama et al. |
| 6,354,974 B1 | 3/2002 | Kozarekar |
| 6,579,201 B2 | 6/2003 | Bowen |
| 6,886,648 B1 | 5/2005 | Hata et al. |
| 7,237,634 B2 | 7/2007 | Severinsky et al. |
| 7,282,008 B2 | 10/2007 | Oshidari |
| 8,182,391 B2 | 5/2012 | Klemen et al. |
| 8,403,807 B2 | 3/2013 | Tabata et al. |
| 8,500,589 B2 | 8/2013 | Ortmann et al. |
| 8,585,523 B2 | 11/2013 | Yamada |
| 8,662,220 B2 | 3/2014 | Burkholder |
| 8,840,502 B2 | 9/2014 | Bergquist |
| 8,905,892 B1 | 12/2014 | Lee et al. |
| 9,139,076 B2 | 9/2015 | Lee et al. |
| 9,266,418 B2 | 2/2016 | Lee et al. |
| 9,327,716 B2 | 5/2016 | Pettersson et al. |
| 9,441,708 B2 | 9/2016 | Kimes et al. |
| 9,592,821 B2 | 3/2017 | Pettersson et al. |
| 9,623,004 B2 | 4/2017 | Kaytor et al. |
| 9,643,481 B2 | 5/2017 | Goleski et al. |
| 9,937,920 B2 | 4/2018 | Lindström et al. |
| 2005/0049100 A1 | 3/2005 | Ai et al. |
| 2007/0056784 A1 | 3/2007 | Joe et al. |
| 2007/0102209 A1 | 5/2007 | Doebereiner |
| 2007/0149334 A1 | 6/2007 | Holmes et al. |
| 2008/0009380 A1 | 1/2008 | Iwanaka et al. |
| 2008/0081734 A1 | 4/2008 | Duffy et al. |
| 2008/0275625 A1 | 11/2008 | Snyder |
| 2008/0318728 A1 | 12/2008 | Soliman et al. |
| 2009/0075779 A1* | 3/2009 | Kumazaki .............. B60K 6/445 477/3 |
| 2009/0076694 A1 | 3/2009 | Tabata et al. |
| 2009/0145673 A1 | 6/2009 | Soliman et al. |
| 2010/0035715 A1 | 2/2010 | Ortmann et al. |
| 2010/0063660 A1 | 3/2010 | Uchida |
| 2010/0099532 A1 | 4/2010 | Cashen |
| 2012/0028757 A1* | 2/2012 | Kimura .................. B60K 6/365 477/5 |
| 2012/0197475 A1 | 8/2012 | Akutsu et al. |
| 2012/0244992 A1 | 9/2012 | Hisada et al. |
| 2012/0245774 A1 | 9/2012 | Takami et al. |
| 2013/0102429 A1 | 4/2013 | Kaltenbach et al. |
| 2013/0109530 A1 | 5/2013 | Kaltenbach et al. |
| 2013/0297134 A1 | 11/2013 | Saito et al. |
| 2013/0316865 A1 | 11/2013 | Engström et al. |
| 2014/0024490 A1 | 1/2014 | Bangura et al. |
| 2014/0051537 A1 | 2/2014 | Liu et al. |
| 2014/0121054 A1 | 5/2014 | Bergquist et al. |
| 2014/0243149 A1 | 8/2014 | Holmes et al. |
| 2015/0046009 A1 | 2/2015 | Maruyama et al. |
| 2015/0051773 A1 | 2/2015 | Hayashi et al. |
| 2015/0149012 A1 | 5/2015 | Pettersson et al. |
| 2015/0239459 A1 | 8/2015 | Pettersson et al. |
| 2015/0336569 A1 | 11/2015 | Matsubara et al. |
| 2015/0375734 A1 | 12/2015 | Pettersson et al. |
| 2016/0052381 A1 | 2/2016 | Kaltenbach et al. |
| 2016/0159344 A1 | 6/2016 | Hata et al. |
| 2016/0176396 A1 | 6/2016 | Hata et al. |
| 2016/0288784 A1 | 10/2016 | Teraya et al. |
| 2017/0001622 A1 | 1/2017 | Lindstrom et al. |
| 2017/0001634 A1 | 1/2017 | Lindstrom et al. |

(56) References Cited

U.S. PATENT DOCUMENTS

| | | |
|---|---|---|
| 2017/0043763 A1 | 2/2017 | Ketfi-Cherif et al. |
| 2017/0144649 A1 | 5/2017 | Bangura et al. |
| 2017/0282702 A1 | 10/2017 | Kim |

FOREIGN PATENT DOCUMENTS

| | | |
|---|---|---|
| DE | 19841829 A1 | 3/2000 |
| DE | 102006054405 A1 | 6/2008 |
| DE | 102007004458 A1 | 7/2008 |
| DE | 102007004464 A1 | 7/2008 |
| DE | 19628000 B4 | 1/2010 |
| DE | 19838853 B4 | 11/2013 |
| EP | 552140 A1 | 10/1995 |
| EP | 552140 B1 | 10/1995 |
| EP | 1145896 A1 | 10/2001 |
| EP | 769404 A1 | 12/2001 |
| EP | 1304249 A2 | 4/2003 |
| EP | 1319546 A1 | 9/2004 |
| EP | 1319546 B1 | 9/2004 |
| EP | 2436546 A1 | 4/2012 |
| FR | 2832356 A1 | 5/2003 |
| JP | 07135701 A | 5/1995 |
| JP | 11332018 A | 11/1999 |
| JP | 3291871 B2 | 6/2002 |
| SE | 1051384 A1 | 6/2012 |
| SE | 536329 C2 | 8/2013 |
| SE | 1200390 A1 | 12/2013 |
| SE | 1200394 A1 | 12/2013 |
| SE | 1250696 A1 | 12/2013 |
| SE | 1250698 A1 | 12/2013 |
| SE | 1250699 A1 | 12/2013 |
| SE | 1250700 A1 | 12/2013 |
| SE | 1250702 A1 | 12/2013 |
| SE | 1250706 A1 | 12/2013 |
| SE | 1250708 A1 | 12/2013 |
| SE | 1250711 A1 | 12/2013 |
| SE | 1250716 A1 | 12/2013 |
| SE | 1250717 A1 | 12/2013 |
| SE | 1250718 A1 | 12/2013 |
| SE | 1250720 A1 | 12/2013 |
| SE | 536559 C2 | 2/2014 |
| WO | 0006407 A1 | 2/2000 |
| WO | 2007113438 A1 | 10/2007 |
| WO | 2007147732 A1 | 12/2007 |
| WO | 2008016357 A2 | 2/2008 |
| WO | 2011070390 A1 | 6/2011 |
| WO | 2012091659 A1 | 7/2012 |
| WO | 2013002707 A1 | 1/2013 |

OTHER PUBLICATIONS

European Search Report from the European Patent Office for PCT/SE2014/051569 dated Sep. 20, 2017.

International Preliminary Report on Patentability for PCT/SE2014/051569 dated Apr. 29, 2015.

Written Opinion of the International Search Authority for PCT/SE14/051569 dated Apr. 30, 2015.

* cited by examiner

METHOD OF BRAKING A VEHICLE TOWARDS STOP

CROSS-REFERENCE TO RELATED APPLICATIONS

This application is a national stage application (filed under 35 § U.S.C. 371) of PCT/SE2014/051569, filed Dec. 23, 2014 of the same title, which, in turn, claims priority to Swedish Application No. 1351574-7, filed Dec. 23, 2013; the contents of each of which are hereby incorporated by reference.

FIELD OF THE INVENTION

The present invention relates to a method for the control of a vehicle, and particularly, but not exclusively, focused on the performance of such a method in motor vehicles in the form of wheeled commercial vehicles, especially heavy goods vehicles, such as trucks and buses. The invention thus relates to a method carried out in a purely electrically powered vehicle or a hybrid vehicle, which, generally, is a vehicle that may be powered by a primary engine, e.g. a combustion engine, and a secondary engine, such as at least one electrical machine. The vehicle is suitably, but for the purposes of the present invention not necessarily, equipped with means for storage of electric energy, such as a battery or a capacitor for storage of electric energy, and control equipment to control the flow of electric energy between the means and the electrical machine. The electrical machine(s) may in such a case alternately operate as an engine or as a generator, depending on the vehicle's operating mode. When the vehicle decelerates, the electrical machine generates energy that may be stored, and the stored electric energy is used later for e.g. operation of the vehicle.

BACKGROUND OF THE INVENTION

Using a conventional clutch mechanism which disconnects the gearbox's input shaft from an combustion engine, where available, during a shifting process in the gearbox entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and the disadvantages associated therewith may be avoided. A vehicle with a drive system of this type constitutes prior art as set out in EP 1 319 546 and SE 536 329.

Certainly, a range of advantageous methods to control a vehicle with a drive system of the type described in SE 536 329 constitute prior art, however there is naturally a constant endeavor to improve the manner of controlling such vehicles, especially in certain specific operating situations.

SUMMARY OF THE INVENTION

The objective of the present invention is to show a method of the type defined above, which is in line with the above-mentioned endeavor.

Having a drive system in a vehicle with a second electrical machine opens up a possibility for an improved behavior in a range of operational situations compared to prior art drive systems lacking such a design of the drive system. Such an operational situation arises where the vehicle is driven with the first locking means in a locked position, and the vehicle must brake towards/to stop. Since the desired braking torque is distributed between the first and the second electrical machines, and the control of the first and second electrical machines is implemented in order to apply a total torque on the output shaft to the planetary gear, corresponding to the increased braking torque at least to a predetermined low speed limit, before the vehicle stops, the braking torque may usually be achieved without any requirement for shifting gears during the deceleration. Since gear shifting is avoided, no braking energy is lost due to torque from an electrical machine being ramped down to prepare for a gear shift.

According to one embodiment of the invention, control is implemented on a vehicle, whose drive system also comprises a combustion engine, which at the performance of the method has an output shaft connected with the second electrical machine's rotor, wherein, in step b) the first and second electrical machine is controlled when a certain value of the vehicle's speed is not met, so that torque balance is achieved in the planetary gear, while simultaneously the total torque transmitted to said output shaft of the planetary gear corresponds to the desired braking torque, and wherein the method also comprises the steps: c) moving the first locking means to a release position, when said torque balance prevails in the planetary gear, and d) controlling the combustion engine and/or the second electrical machine towards a predetermined rotational speed. Substantially the same total braking torque may then be maintained when the planetary gear has been unlocked, and the combustion engine is controlled to said predetermined engine speed, e.g. the combustion engine's idling speed, or when it has been turned off. Therefore, it is often advantageous to brake in one and the same gear the whole way, until the vehicle stops. Accordingly, the fraction of braking energy that may be regenerated with a hybrid system is greatly increased.

According to another embodiment of the invention, a vehicle is controlled, which has a drive system comprising a second locking means that may be moved between a position in which the combustion engine's output shaft is locked together with the second electrical machine's rotor and said first component, and a release position in which the combustion engine's output shaft is disconnected from the second electrical machine's rotor and said first component, and is allowed to rotate independently of these, the second locking means being in said locked position when the method is carried out. Such second locking means facilitates the disconnection of the combustion engine from the planetary gear, when the vehicle is powered purely electrically. However, the invention provides for the combustion engine's output shaft to be permanently connected with the second electrical machine's rotor.

According to another embodiment of the invention, the method is implemented for a vehicle with a drive system that has at least one said controllable energy consumer in the form of a braking resistor. A braking resistor is a power resistor with suitable power electronics, entailing that consumed power may be controllably varied and adjusted continuously. A braking resistor is connected the same way as an energy storage means.

According to another embodiment of the invention, the method is carried out in a vehicle with a said drive system, in which the planetary gear's sun wheel is said first component and the ring gear is said third component. By connecting the first electrical machine's rotor with the ring gear and the combustion engine's output shaft with the sun wheel, a compact construction is achieved which is easy to fit into already existing spaces for powertrains (drive systems) with clutch mechanisms instead of planetary gears.

According to another embodiment of the invention the method is implemented in a vehicle with a gearbox having an input shaft, which is connected with said second output shaft in the planetary gear. Via the inventive method, the combustion engine may be started without any torque interruption, and with a potential for the driver of the vehicle to maintain or change the torque transmitted to the vehicle's powertrain.

The invention also relates to a computer program product and an electronic control device.

Other advantageous features and advantages with the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
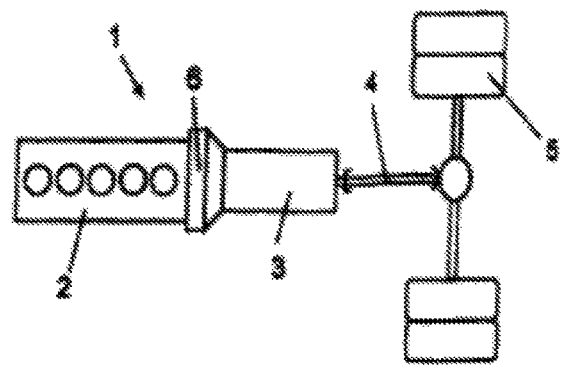
FIG. 1 is a very simplified view of a powertrain in a vehicle that may be equipped with a drive system for the performance of a method according to the invention.
Figure 2:
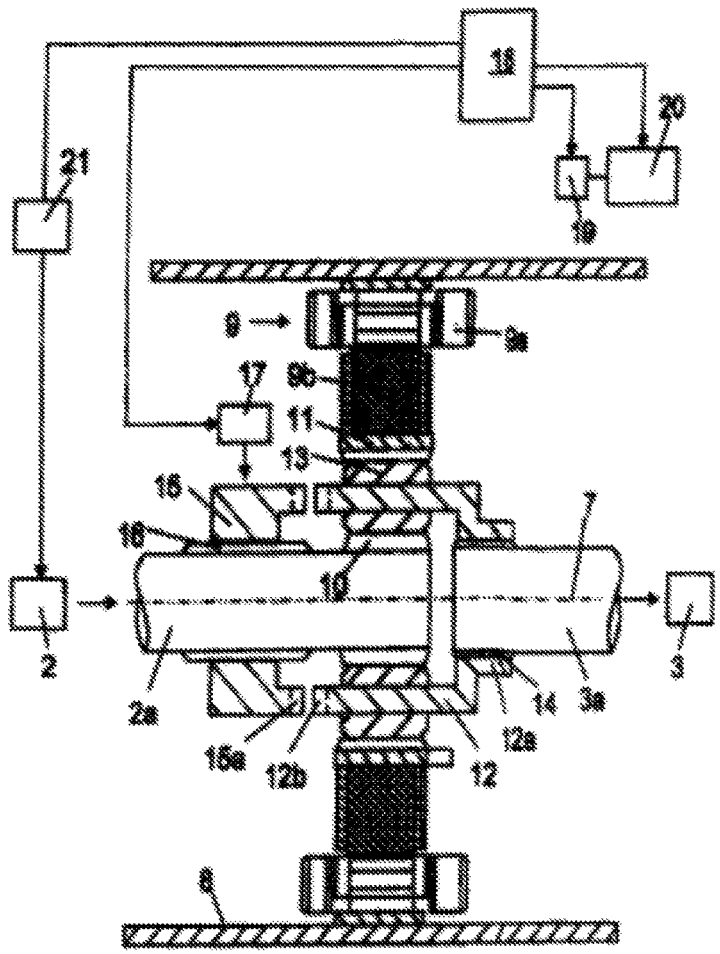
FIG. 2 is a more detailed, but still simplified view of a part of said drive system.

FIG. 1 shows a powertrain for a heavy goods vehicle 1. The powertrain comprises a combustion engine 2, a power transmission 3 in the form of for example a speed gearbox, a continuously variable transmission (CVT), or a direct transmission, a number of driving shafts 4 and driving wheels 5. Between the combustion engine 2 and the gearbox 3 the powertrain comprises an intermediate section 6. FIG. 2 shows a part of the components in the intermediate section 6 in more detail, more specifically those which also occur in prior art drive systems, such as the one according to SE 536 329. The combustion engine 2 is equipped with an output shaft 2a and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator-core which is fixed in a suitable manner on the inside of the house 8. The stator core comprises the stator's windings. The first electrical machine 9 is adapted, under certain operating circumstances, to use stored electrical energy to supply driving force to the input shaft 3a of the gearbox and under other operating conditions, to use the kinetic energy of the input shaft 3 of the gearbox to extract and store electric energy.

The planetary gear is arranged substantially radially inside of the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13, which are rotatably arranged in a radial space between the teeth of the sun wheel 10 and the ring gear 11. The sun wheel 10 is fixed on a peripheral surface of the combustion engine's output shaft 2a. The sun wheel 10 and the combustion engine's output shaft 2a rotate as one unit with a first rotational speed $n_1$. The planetary wheel carrier 12 comprises an attachment section 12a, which is attached on a peripheral surface of the input shaft 3a of the gearbox with the help of a splines-joint 14. With the help of this joint, the planetary wheel carrier 12 and the gearbox's input shaft 3a may rotate as one unit with a second rotational speed $n_2$. The ring gear 11 comprises an external peripheral surface on which the rotor 9b is fixedly mounted. The rotor 9b and the ring gear 11 constitute one rotatable unit which rotates at a third rotational speed $n_3$.

The drive system comprises a first locking means since the combustion engine's output shaft 2a is equipped with a shiftable clutch element 15. The clutch element 15 is mounted on the combustion engine's output shaft 2a with the help of a splines-joint 16. The clutch element 15 is in this case arranged in a twist-fast manner on the combustion engine's output shaft 2a, and is shiftably arranged in an axial direction on the combustion engine's output shaft 2a. The clutch element 15 comprises a clutch section 15a, which is connectible with a clutch section 12b in the planetary wheel carrier 12. A schematically displayed shifting element 17 is adapted to shift the clutch element 15 between a first position where the clutch sections 15a, 12b are not in engagement with each other, corresponding to a release position in the first locking means, and a second position where the clutch sections 15a, 12b are in engagement with each other, corresponding to a locked position of the first locking means. In such locked position the combustion engine's output shaft 2a and the gearbox's input shaft 3a will be locked together and accordingly these and the electrical machine's rotor will rotate at the same engine speed. This state may be referred to as a locked planet. The locking mechanism may also advantageously have the design described in the Swedish patent application SE 536 559, and comprise a sleeve equipped with first splines, which engage, in the release position, with second splines on a first component of the planetary gear, and in the locked position, engage with third splines on a second component of the planetary gear. In this case the first component is preferably the planetary wheel carrier and the second component is the sun wheel. The locking mechanism may then be adapted like an annular sleeve, enclosing the planetary wheel carrier substantially concentrically. The locking means may also be made of a suitable type of friction clutch.

An electronic control device 18 is adapted to control the shifting element 17. The control device 18 is also adapted to determine the occasions on which the electrical machine should operate as an engine and the occasions on which it should operate as a generator. In order to so determine, the control device 18 may receive up to date information relating to suitable operating parameters. The control device 18 may be a computer with software for this purpose. The control device 18 controls a schematically displayed control equipment 19, which controls the flow of electric energy between a hybrid battery 20 and the stator windings 9a of the electrical machine. On occasions where the electrical machine 9 operates as an engine, stored electric energy is supplied from the hybrid battery 20 to the stator 9a. On occasions where the electrical machine operates as a generator electric energy is supplied from the stator 9a to the hybrid battery 20. The hybrid battery 20 delivers and stores electric energy with a voltage in the range of 300-900 Volt. Since the intermediate section 6 between the combustion engine 2 and the gearbox 3 in the vehicle is limited, the electrical machine 9 and the planetary gear must constitute a compact unit. The planetary gear's components 10, 11, 12 are arranged substantially radially inside the electrical machine's stator 9a. The rotor 9b of the electrical machine, the ring gear 11 of the planetary gear, the combustion engine's output shaft 2a and the input shaft 3a of the gearbox are here rotatably arranged around a common rotation axis 5. With such an embodiment the electrical machine 9 and the planetary gear occupy a relatively small area. The vehicle 1 is equipped with an engine control function 21, with which engine speed $n_1$ and/or torque of the combustion engine 2 may be controlled. The control device 18 accordingly has the possibility of activating the engine control function 21 and of creating a substantially zero torque state in the gearbox 3 at engagement and disengagement of gears in the gearbox 3. Naturally, the drive system may, instead of being controlled by one single control device 18, be controlled by several different control devices.

The part of a drive system of a vehicle, thus far described, and displayed at FIG. 2, on which a method according to the invention may be implemented is extant in the drive system according to SE 536 329. Below, a part of the drive system, which may be added to this part for the performance of the invention, will be described with reference to FIG. 3.

The drive system, specifically the intermediate section 6, also has a second electrical machine 30 with a stator 31, with stator windings and a rotor 32 which is connected with the combustion engine's output shaft 2a. A second locking means 33, which may have a similar design as the first locking means 34, illustrated in more detail in FIG. 2, is adapted to separate, in a release position, a first part 35 of the combustion engine's output shaft, arranged nearest the combustion engine, from a second part 36 thereof, connected with the sun wheel 10 of the planetary gear, so that the second electrical machine's rotor 32 and the sun wheel 10 are allowed to rotate independently of the first section 35 of the combustion engine's output shaft. The second locking means may be moved to a locked position in which both the parts 35, 36 of the combustion engine's output shaft are locked together, and accordingly the first part 35 is locked together with the second electrical machine's rotor. The control device 18 is adapted to control fuel supply to the combustion engine 2 and to control exchange of electric energy between the first electrical machine 9 and the second electrical machine 30 on the one hand, and, on the other hand, electric energy storage means such as batteries, and electric auxiliary units and loads in the vehicle, such as servo control units, pumps, cooling aggregates and similar.

A range of positive features are achieved in the drive system through the added arrangement of the electrical machine 30 and the second locking means 33. If the vehicle is driven with the first locking means 34 in a locked position and for example the second locking means 33 in a locked position, and a request arises for shifting the first locking means 34 into a release position, the power unit configuration is controlled towards a torque balance between the components that are locked together, i.e. the planetary wheel carrier 12 and the sun wheel 10, via the first locking means 34. This may be achieved by controlling the first electrical machine 9 and at least one of the second electrical machine 30 and the combustion engine 2, since the second locking means 33 is in a locked position, and the first electrical machine 9 and/or the second electrical machine 30, towards said torque balance, so that there is also a possibility for energy storage in the hybrid battery 30 if desired. Here, torque balance is achieved when the following relation between the torques applied is met for the example configuration displayed in FIG. 3:

$$T_{sun\ wheel} = \frac{Z_s}{Z_r} T_{ring\ gear}$$

where $T_{sun\ wheel}$ and $T_{ring\ gear}$ represent the torque applied to the sun wheel and the ring gear, respectively, where $T_{sun\ wheel} = T_{ice} + T_{em2}$ and $T_{ring\ gear} = T_{em1}$ where $T_{ice}$ is torque applied to the combustion engine's output shaft $T_{em2}$ is torque applied via the second electrical machine's stator to its rotor $T_{em1}$ is torque applied via the first electrical machine's stator to its rotor, $Z_s$ is the number of teeth on the sun wheel, $Z_r$ is the number of teeth on the ring gear.

Accordingly, torque balance relates to the state where a torque acts on a ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1 minus the planetary gear's gear ratio). At such torque balance said first locking means 34 does not transfer any torque between the components of the planetary gear. Once torque balance has been achieved, the first locking means 34 may easily be moved to the release position, so that the planetary gear's components are no longer locked together.

Figure 3:
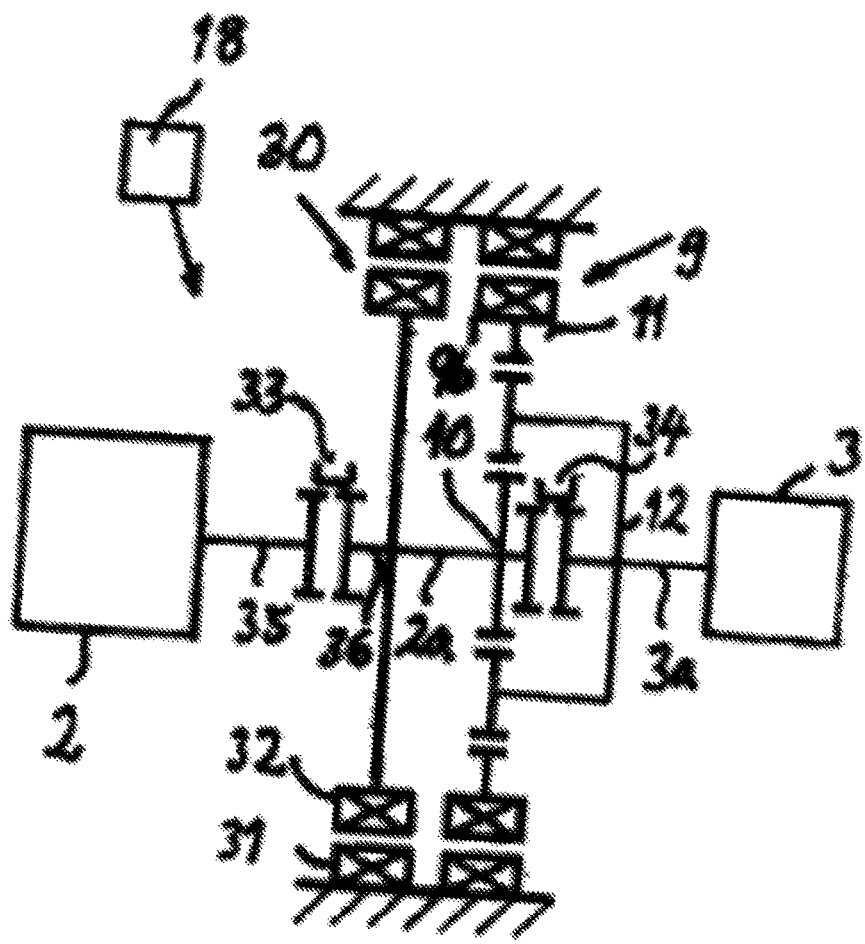
FIG. 3 is a simplified view, illustrating the general structure of a drive system in a vehicle, for which a method according to one embodiment of the invention is carried out.

A great advantage of a drive system according to FIG. 3, with or without the second locking means, is the potential for continuous electric power supply by the electric units in all operating modes, with the combustion engine connected in a steady state. This is normally not achieved with hybrid solutions having only one electrical machine. When the first locking means is in a locked position, said electric unit is supplied by substantially distributing the requested electrical power to the electric auxiliary aggregates and the electric loads of the vehicle between the electrical machines. In this way, the losses in the electrical machines are minimized since the torque per electrical machine is halved compared to if an electrical machine had supplied all the electrical output. Since the loss effects of the electrical machines substantially scale against the torque applied squared, this entails substantially a halving of the losses of the electrical machines. However, such a distribution (50/50) is potentially not optimal in case the two electrical machines have dimensions which differ considerably from each other, but efforts are still made to select said proportions with this optimal distribution in mind. When the first locking means is open, the first electrical machine will determine the torque in the powertrain. The engine speed of the combustion engine is controlled to an operational point, which is selected by minimizing the losses of the combustion engine together with losses of the electrical machine and the inverter. The second electrical machine is then used to balance the power for potential energy storage means, electrical aggregates and the first electrical machine. The supply may also take place continuously during all types of up- and down-shifts, during crawling, start-off and braking.

Figure 4:
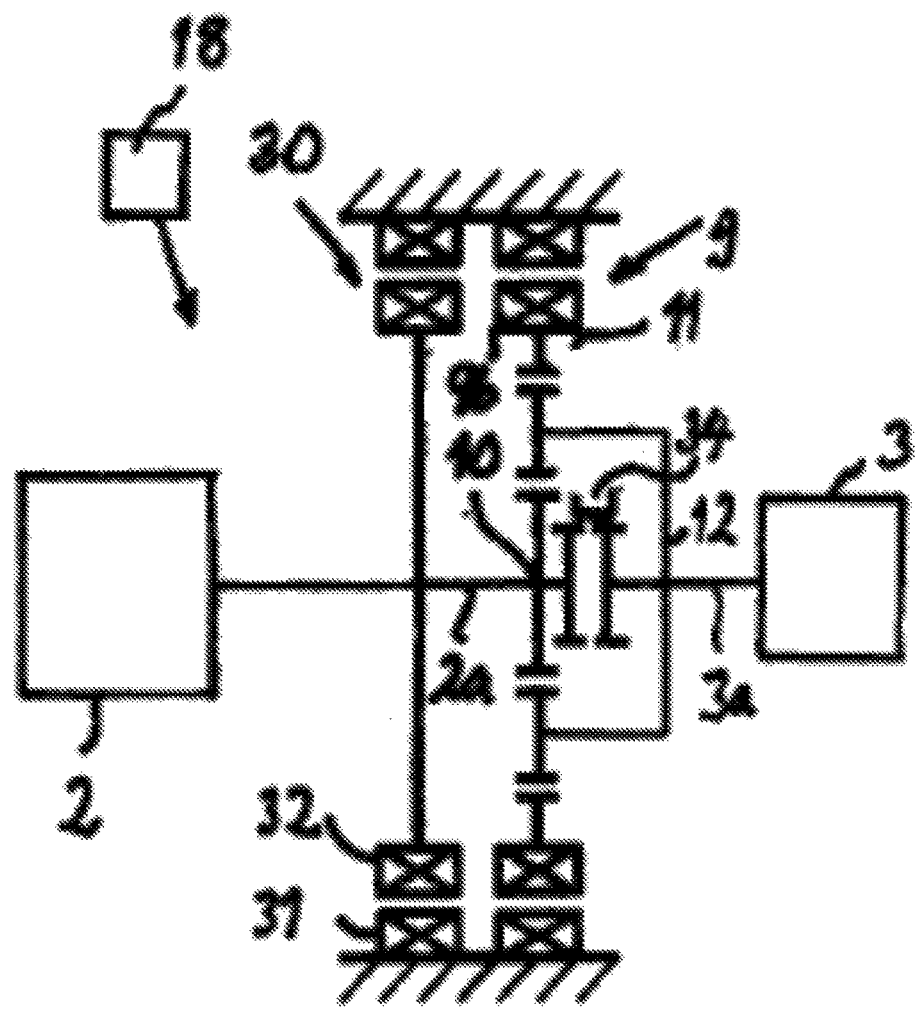
FIG. 4 is a simplified view, illustrating the general structure of another drive system in a vehicle, for which a method according to one embodiment of the invention is carried out.
Figure 5:
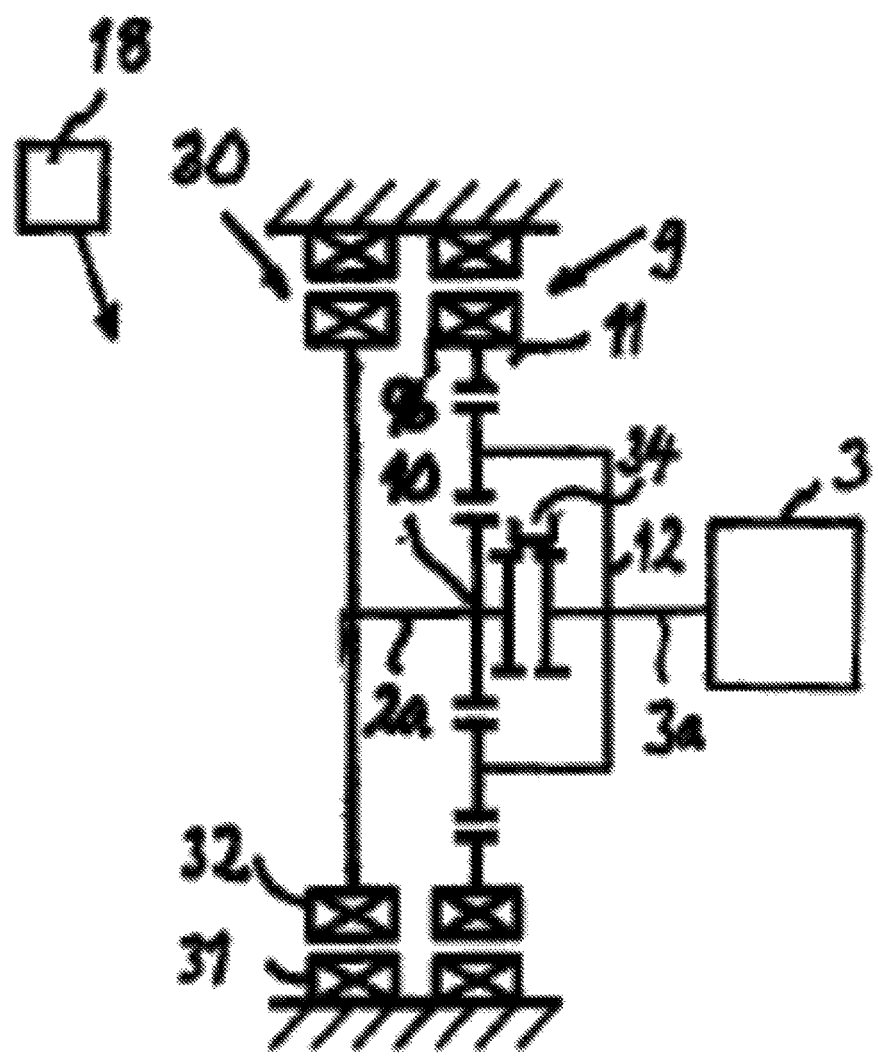
FIG. 5 is a simplified view, illustrating the general structure of another drive system in a vehicle, for which a method according to one embodiment of the invention is carried out.

FIG. 4 shows, in a simplified way, a drive system which differs from the one according to FIG. 3, since the combustion engine 2 is permanently connected with the second electrical machine's rotor 32, while FIG. 5 shows, in a simplified way, a drive system which entirely lacks a combustion engine. Embodiments of the innovative method may be carried out in vehicles with these alternative drive systems.

"Electrical energy storage means" as used in this document means an energy storage means with an electrical interface in relation to the first and second electrical machine of the drive system, but storage of energy does not have to be electrical. This entails that in addition to an electrical battery and capacitor, for example flywheels, other mechanical means and means for building up pressure, e.g. pneumatic or hydraulic means, may be considered.

Figure 6:
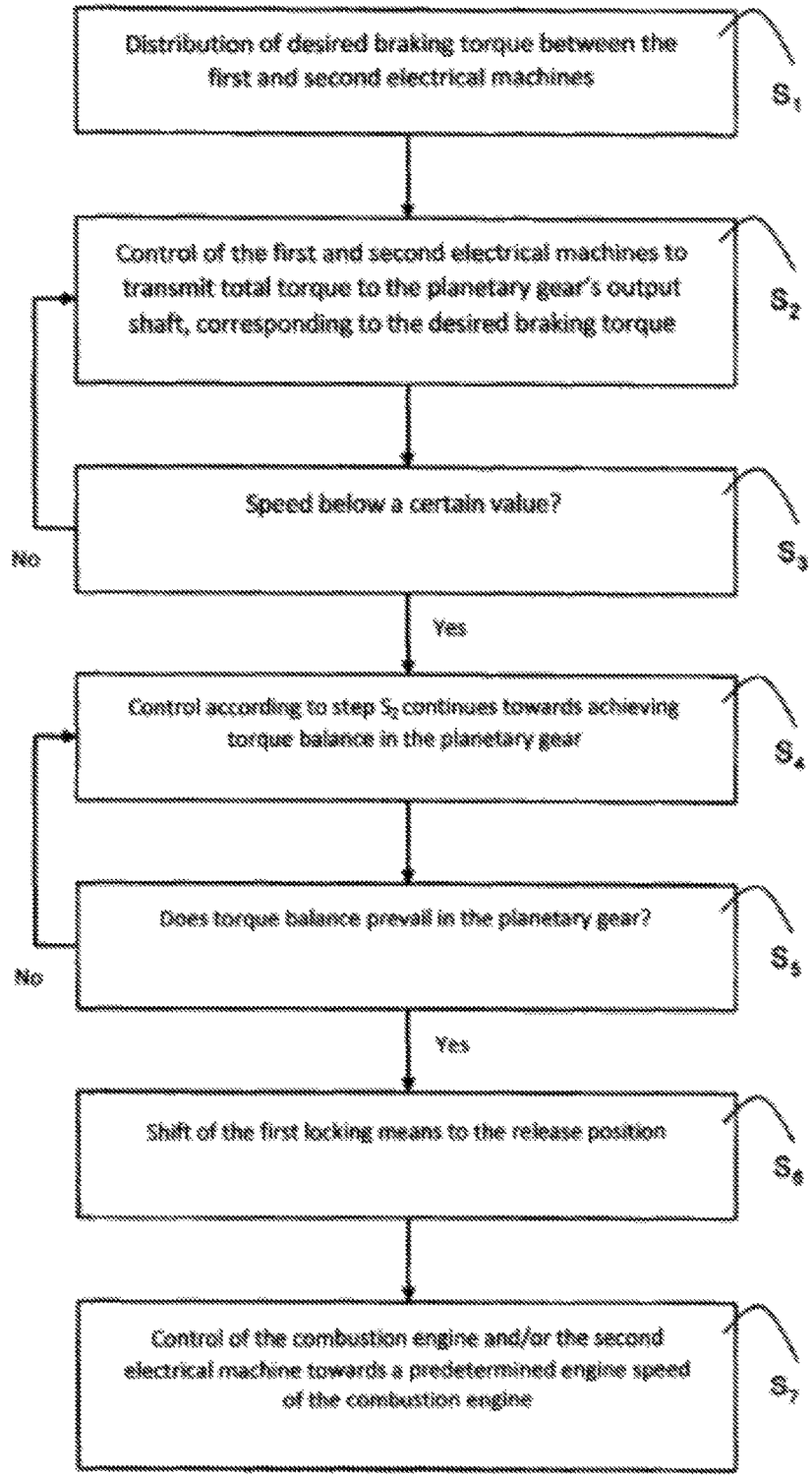
FIG. 6 is a flow chart showing a method according to one embodiment of the invention.

FIG. 6 illustrates a flow chart of a method according to one embodiment of the present invention, implemented in a vehicle with a drive system of the type displayed at FIG. 3-5. The vehicle is driven with the first locking means in a locked position, and subsequently a request to brake the vehicle to a stop arises. In a first step $S_1$, a distribution of the desired braking torque to the first and the second electrical machines is then carried out. In a second step $S_2$, the first and second electrical machines are then controlled to transmit the total torque to the planetary gear's output shaft, corresponding to the desired braking torque at least to a predetermined low speed limit, before the vehicle stops. Then, in a step $S_3$, a question is asked as to whether the speed has dropped below a certain value, e.g. a value between 5 and 10 km/h. If the answer to the question is "yes", a step $S_4$ follows, where the control according to step $S_2$ is implemented in order to achieve torque balance in the planetary gear. In step $S_5$ a question is then asked as to whether torque balance has been achieved, and if the answer is "yes", a step $S_6$ follows, where the first locking means are moved to a release position. In step $S_7$, the combustion engine and/or the second electrical machine are then controlled towards a predetermined rotational speed of the combustion engine, e.g. its idling speed.

Computer program code for implementation of a method according to the invention is suitably included in a computer program, which is loadable into the internal memory of a computer, such as the internal memory of an electronic control device of a vehicle. Such a computer program is suitably provided via a computer program product, comprising a data storage medium readable by an electronic control device, which data storage medium has the computer program stored thereon. Said data storage medium is e.g. an optical data storage medium in the form of a CD-ROM, a DVD, etc., a magnetic data storage medium in the form of a hard disk drive, a diskette, a cassette, etc., or a Flash memory or a ROM, PROM, EPROM or EEPROM type memory.

Figure 7:
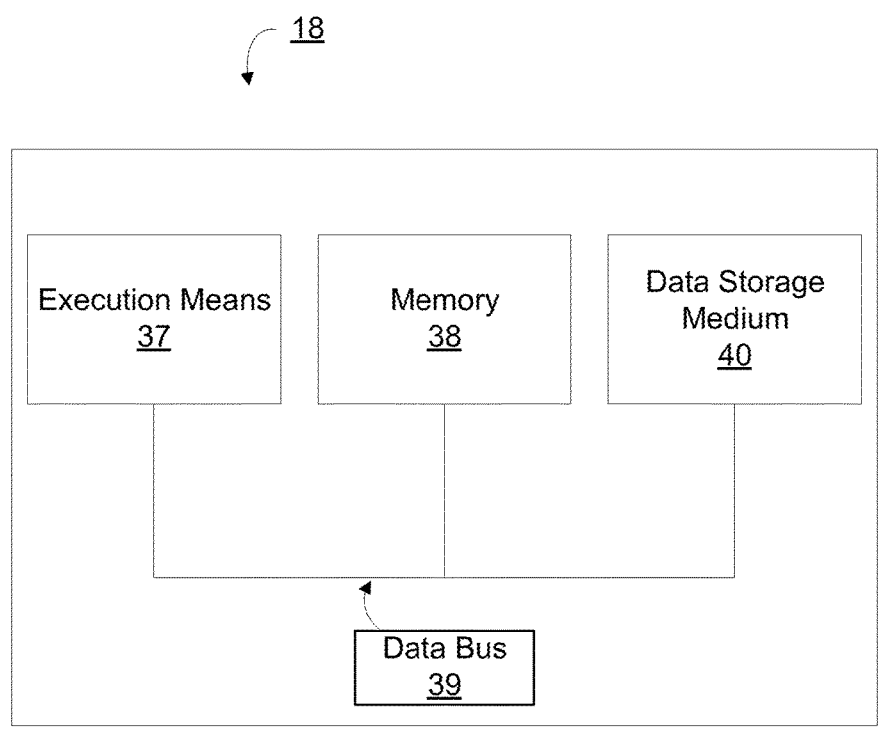
FIG. 7 is a fundamental diagram of an electronic control device for implementation of one or several methods according to the invention.

FIG. 7 very schematically illustrates an electronic control device 18 comprising execution means 37, such as a central processor unit (CPU), for the execution of computer software. The execution means 37 communicates with a memory 38, e.g. a RAM memory, via a data bus 39. The control device 18 also comprises a durable data storage medium 40, e.g. in the form of a Flash memory or a ROM, PROM, EPROM or EEPROM type memory. The execution means 37 communicates with the data storage means 40 via the data bus 39. A computer program comprising computer program code for the implementation of a method according to the invention is stored on the data storage medium 40.

The invention is obviously not limited in any way to the embodiments described above, but numerous possible modifications thereof should be obvious to a person skilled in the area, without such person departing from the spirit of the invention as defined by the appended claims.

The inventive method could be carried out in a vehicle with a drive system, which has the planetary gear's ring gear as said first component and the sun wheel as said third component, which means that the first electrical machine's rotor would be connected with the planetary sun wheel and the second electrical machine's rotor and the combustion engine would be connected with the planetary gear's ring gear instead of with the sun wheel. Advantageously, however, the planetary gear's output shaft for transmission of torque for the vehicle's propulsion is connected with the planetary wheel carrier.

Nor is it necessary for the output shaft from the planetary gear to be an input shaft in a gearbox, instead the vehicle could have no gearbox.

The invention claimed is:

1. A method for control of a vehicle with a drive system comprising a planetary gear which comprises three components in the form of a sun wheel, a ring gear and planetary wheel carrier, wherein a first input shaft in the planetary gear is connected with a first of said components of the planetary gear, so that a rotation of said first input shaft leads to a rotation of such first of said components, wherein a second output shaft of the planetary gear is connected with a second of said components in the planetary gear, for transmission of torque for the propulsion of the vehicle, so that a rotation of said second output shaft leads to a rotation of such second of said components, wherein the drive system comprises a first electrical machine with a stator and a rotor, which is connected with a third of said components of the planetary gear, so that a rotation of the rotor leads to a rotation of such third of said components, and wherein the drive system also comprises a first locking means, which may be moved between a locked position in which two of said components in the planetary gear are locked together, so that the three components in the planetary gear rotate with the same rotational speed, and a release position in which the components in the planetary gear are allowed to rotate with different rotational speeds, wherein the vehicle is controlled, whose drive system also comprises a second electrical machine with a stator and a rotor, connected with said first input shaft of the planetary gear, and at least one energy storage means arranged for exchange of energy between the at least one energy storage means and at least one of the first electrical machine, the second electrical machine or a controllable energy consumer, and in that the method comprises the following steps in order to brake the vehicle towards a stop, when the vehicle is driven with the first locking means in a locked position:
   a) distributing a desired braking torque between the first and the second electrical machines; and
   b) controlling the first and second electrical machines to transmit a total torque to said second output shaft of the planetary gear, which corresponds to the desired braking torque, such that the controlling occurs at least to a predetermined low speed limit of the vehicle, before the vehicle stops.

2. The method according to claim 1, wherein the control is carried out by the vehicle whose drive system also comprises a combustion engine, which, when the method is performed, has an output shaft connected with the second electrical machine's rotor, and in controlling the first and second electrical machines to transmit a total torque to said second output shaft of the planetary gear, the first and the second electrical machines, when the vehicle's speed drops below a certain value, are controlled in such a way that torque balance is achieved in the planetary gear, while the total torque transmitted to said second output shaft of the planetary gear corresponds to the desired braking torque, and in that the method also comprises the steps:

c) shifting of the first locking means to the release position, when said torque balance prevails in the planetary gear; and d) controlling at least one of the combustion engine or the second electrical machine towards a predetermined engine speed of the combustion engine.

3. The method according to claim 2, wherein the vehicle is controlled, whose drive system also comprises a second locking means that may be moved between a position in which the combustion engine's output shaft is locked together with the second electrical machine's rotor and said first of said components in the planetary gear, and a release position in which the combustion engine's output shaft is disconnected from the second electrical machine's rotor and said first of said components in the planetary gear, and is allowed to rotate independently of the second electrical machine's rotor and said first of said components in the planetary gear, and in that the second locking means is in said locked position when the method is implemented.

4. The method according to claim 1, wherein the method is implemented for the vehicle with said drive system with at least one said controllable energy consumer in the form of a braking resistor.

5. The method according to claim 1, wherein the method is implemented in the vehicle with said drive system, in which the planetary gear's sun wheel is said first of said components and the planetary gear's ring gear is said third of said components.

6. The method according to claim 1, wherein the method is implemented in the vehicle with a gearbox with gearbox input shaft, which is connected with said second output shaft of the planetary gear.

7. A computer program product for braking a vehicle towards a stop, when the vehicle is driven with a first locking means in a locked position, wherein the vehicle comprises a drive system comprising a planetary gear which comprises three components in the form of a sun wheel, a ring gear and planetary wheel carrier, wherein a first input shaft in the planetary gear is connected with a first of said components of the planetary gear, so that a rotation of said first input shaft leads to a rotation of such first of said components, wherein a second output shaft of the planetary gear is connected with a second of said components in the planetary gear, for transmission of torque for the propulsion of the vehicle, so that a rotation of said second output shaft leads to a rotation of such second of said components, wherein the drive system comprises a first electrical machine with a stator and a rotor, which is connected with a third of said components of the planetary gear, so that a rotation of the rotor leads to a rotation of such third of said components, and wherein the drive system also comprises a first locking means, which may be moved between a locked position in which two of said components in the planetary gear are locked together, so that the three components in the planetary gear rotate with the same rotational speed, and a release position in which the components in the planetary gear are allowed to rotate with different rotational speeds, wherein the vehicle is controlled, whose drive system also comprises a second electrical machine with a stator and a rotor, connected with said first input shaft of the planetary gear, and at least one energy storage means arranged for exchange of energy between the at least one energy storage means and at least one of the first electrical machine, the second electrical machine or a controllable energy consumer, wherein the computer program product is stored in a non-transitory computer-readable medium and comprises computer-readable program code portions embodied therein, the computer-readable program code comprises computer code to cause an electronic processor to:

a) distribute the desired braking torque between the first and the second electrical machines; and b) control the first and second electrical machines to transmit a total torque to said second output shaft of the planetary gear, which corresponds to the desired braking torque, such that the controlling occurs at least to a predetermined low speed limit of the vehicle, before the vehicle stops.

8. The computer program product according to claim 7, wherein the control is carried out with the vehicle whose drive system also comprises a combustion engine, which, when the computer program product is performed, has an output shaft connected with the second electrical machine's rotor, and in controlling the first and second electrical machines to transmit a total torque to said second output shaft of the planetary gear, the first and the second electrical machines, when the vehicle's speed drops below a certain value, are controlled in such a way that torque balance is achieved in the planetary gear, while the total torque transmitted to said second output shaft of the planetary gear corresponds to the desired braking torque, and in that the computer program product further comprises computer code to cause an electronic processor to:

c) shifting of the first locking means to the release position, when said torque balance prevails in the planetary gear; and d) controlling at least one of the combustion engine or the second electrical machine towards a predetermined engine speed of the combustion engine.

9. The computer program product according to claim 8, wherein the vehicle is controlled, whose drive system also comprises a second locking means that may be moved between a position in which the combustion engine's output shaft is locked together with the second electrical machine's rotor and said first of said components in the planetary gear, and a release position in which the combustion engine's output shaft is disconnected from the second electrical machine's rotor and said first of said components in the planetary gear, and is allowed to rotate independently of the second electrical machine's rotor and said first of said components in the planetary gear, and in that the second locking means is in said locked position when the computer program product is operated.

10. The computer program product according to claim 7, wherein the computer program product is operated for the vehicle with said drive system with at least one said controllable energy consumer in the form of a braking resistor.

11. The computer program product according to claim 7, wherein the computer program product is operated in the vehicle with said drive system, in which the planetary gear's sun wheel is said first of said components and the planetary gear's ring gear is said third of said components.

12. The computer program product according to claim 7, wherein the computer program product is operated in the vehicle with a gearbox with gearbox input shaft, which is connected with said second output shaft of the planetary gear.

13. An electronic control device for braking a vehicle towards a stop, when the vehicle is driven with a first locking means in a locked position,
wherein the vehicle comprises a drive system comprising a planetary gear which comprises three components in the form of a sun wheel, a ring gear and planetary wheel carrier, wherein a first input shaft in the planetary gear is connected with a first of said components of the planetary gear, so that a rotation of said first input shaft leads to a rotation of such first of said components, wherein a second output shaft of the planetary gear is connected with a second of said components in the planetary gear, for transmission of torque for the propulsion of the vehicle, so that a rotation of said second output shaft leads to a rotation of such second of said components, wherein the drive system comprises a first electrical machine with a stator and a rotor, which is connected with a third of said components of the planetary gear, so that a rotation of the rotor leads to a rotation of such third of said components, and wherein the drive system also comprises a first locking means, which may be moved between a locked position in which two of said components in the planetary gear are locked together, so that the three components in the planetary gear rotate with the same rotational speed, and a release position in which the components in the planetary gear are allowed to rotate with different rotational speeds, wherein the vehicle is controlled, whose drive system also comprises a second electrical machine with a stator and a rotor, connected with said first input shaft of the planetary gear, and at least one energy storage means arranged for exchange of energy between the at least one energy storage means and at least one of the first electrical machine, the second electrical machine or a controllable energy consumer, wherein said electronic device comprises:
a storage device;
an electronic processor operatively coupled to the storage device; and
a computer program product stored in a non-transitory computer-readable medium on the storage device and comprising computer-readable program code portions embodied therein, the computer-readable program code comprises computer code to cause an electronic processor to:

a) distribute desired braking torque between the first and the second electrical machines; and
b) control the first and second electrical machines to transmit a total torque to said second output shaft of the planetary gear, which corresponds to the desired braking torque, such that the controlling occurs at least to a predetermined low speed limit of the vehicle, before the vehicle stops.

14. The electronic control device according to claim 13, wherein the control is carried out with the vehicle whose drive system also comprises a combustion engine, which, when the computer program product is performed, has an output shaft connected with the second electrical machine's rotor, and in controlling the first and second electrical machines to transmit a total torque to said second output shaft of the planetary gear, the first and the second electrical machines, when the vehicle's speed drops below a certain value, are controlled in such a way that torque balance is achieved in the planetary gear, while the total torque transmitted to said second output shaft of the planetary gear corresponds to the desired braking torque, and in that the computer program product further comprises computer code to cause an electronic processor to:
c) shifting of the first locking means to the release position, when said torque balance prevails in the planetary gear; and
d) controlling at least one of the combustion engine or the second electrical machine towards a predetermined engine speed of the combustion engine.

15. The electronic control device according to claim 14, wherein the vehicle is controlled, whose drive system also comprises a second locking means that may be moved between a position in which the combustion engine's output shaft is locked together with the second electrical machine's rotor and said first of said components in the planetary gear, and a release position in which the combustion engine's output shaft is disconnected from the second electrical machine's rotor and said first of said components in the planetary gear, and is allowed to rotate independently of the second electrical machine's rotor and said first of said components in the planetary gear, and in that the second locking means is in said locked position when the computer program product is operated.

16. The electronic control device according to claim 13, wherein the computer program product is operated for the vehicle with said drive system with at least one said controllable energy consumer in the form of a braking resistor.

17. The electronic control device according to claim 13, wherein the computer program product is operated in the vehicle with said drive system, in which the planetary gear's sun wheel is said first of said components and the planetary gear's ring gear is said third of said components.

18. The electronic control device according to claim 13, wherein the computer program product is operated in the vehicle with a gearbox with gearbox input shaft, which is connected with said second output shaft of the planetary gear.

* * * * *